US009933542B2

(12) United States Patent
Bittar et al.

(10) Patent No.: US 9,933,542 B2
(45) Date of Patent: Apr. 3, 2018

(54) DRILL BIT FOR PERFORMING ELECTROMAGNETIC MEASUREMENTS IN A SUBTERRANEAN FORMATION

(75) Inventors: Michael Bittar, Houston, TX (US); Ronald Johannes Dirksen, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 465 days.

(21) Appl. No.: 14/115,002

(22) PCT Filed: Nov. 9, 2011

(86) PCT No.: PCT/US2011/059905
§ 371 (c)(1),
(2), (4) Date: Oct. 31, 2013

(87) PCT Pub. No.: WO2013/070200
PCT Pub. Date: May 16, 2013

(65) Prior Publication Data
US 2014/0060820 A1 Mar. 6, 2014

(51) Int. Cl.
*G01V 3/28* (2006.01)
*E21B 47/01* (2012.01)
*E21B 10/00* (2006.01)

(52) U.S. Cl.
CPC ............... *G01V 3/28* (2013.01); *E21B 10/00* (2013.01); *E21B 47/01* (2013.01)

(58) Field of Classification Search
CPC .................................. E21B 25/16; G01V 3/18
(Continued)

(56) References Cited

U.S. PATENT DOCUMENTS 7,884,611 B1 * 2/2011 Hall .................. G01V 3/28
324/339
8,704,721 B2 * 4/2014 Ferrer Herrera ....... H01Q 1/007
343/788
(Continued)

FOREIGN PATENT DOCUMENTS

WO 2008/094253 A1 8/2008
WO 2008094256 A1 8/2008
(Continued)

OTHER PUBLICATIONS

Free Space Path Loss FSPL for "frequency and its relationship with distance", accessed on Apr. 9, 2016 via http://www.radio-electronics.com/info/propagation/path-loss/free-space-formula-equation.php.*
(Continued)

*Primary Examiner* — Giovanna C. Wright
*Assistant Examiner* — Manuel C Portocarrero
(74) *Attorney, Agent, or Firm* — Benjamin Fite; Baker Botts L.L.P.

(57) ABSTRACT

A drill bit for measuring the electromagnetic propagation resistivity of a subterranean formation is disclosed. The drill bit includes a shank portion and a cutting portion with a raised face. The drill bit includes a transmitter element and a receiver element disposed on the raised face. The transmitter element propagates electromagnetic waves into a subterranean formation with a frequency of at least one gigahertz. The receiver element is positioned relative to the transmitter element at a pre-determined distance, with the predetermined distance is based, at least in part, on the frequency of the electromagnetic wave.

20 Claims, 5 Drawing Sheets

(58) Field of Classification Search
USPC .................................................. 166/254.2
See application file for complete search history.

(56) References Cited

U.S. PATENT DOCUMENTS

| | | |
|---|---|---|
| 2006/0175057 A1 | 8/2006 | Mandal et al. |
| 2007/0075442 A1* | 4/2007 | Krishnamoorthy ... G02B 6/12007 257/797 |
| 2007/0229304 A1 | 10/2007 | Hall et al. |
| 2009/0278543 A1* | 11/2009 | Beste ..................... G01V 3/28 324/339 |
| 2010/0295547 A1 | 11/2010 | Hall et al. |
| 2011/0234230 A1* | 9/2011 | Bittar ..................... E21B 47/01 324/333 |

FOREIGN PATENT DOCUMENTS

| | | |
|---|---|---|
| WO | 2010/074678 A2 | 7/2010 |
| WO | 2011/090480 A1 | 7/2011 |
| WO | 2011/090481 A1 | 7/2011 |

OTHER PUBLICATIONS

International Search Report and Written Opinion, International Application No. PCT/US2011/059905, 10 pgs., dated Jul. 4, 2012.
Office Action issued in the related MY Application No. PI 2014001349, dated Aug. 30, 2017 (3 pages).

* cited by examiner

DRILL BIT FOR PERFORMING ELECTROMAGNETIC MEASUREMENTS IN A SUBTERRANEAN FORMATION

CROSS-REFERENCE TO RELATED APPLICATION

This application is a U.S. National Stage Application of International Application No. PCT/US2011/059905 filed Nov. 9, 2011, and which is hereby incorporated by reference in its entirety.

BACKGROUND

The present disclosure relates generally to well logging tools used in subterranean formations and, more particularly, the present disclosure relates to methods and apparatus for measuring electromagnetic propagation resistivity using a drill bit.

To ease the process of drilling into a formation and to improve production yields for desirable formation fluids, the oilfield-services industry has developed processes and tools for measuring properties of the formation during drilling or shortly thereafter, a process called "logging while drilling" (LWD). Integrating logging while drilling not only shortens the time needed to make the well operational, but also allows a drill operator to measure the formation's properties. LWD tools and methods evaluate multiple parameters, such as formation resistivity to determine the types of minerals and/or fluids that comprise the formation. Generally, logging tools and processes involve radiation of energy, such as electromagnetic waves, into the formation to induce energy from the formation. The characteristics of the induced energy reveal properties of the formation. Properties of particular value in the drilling process are the identity, location and relative proportions of minerals and fluids present in the disclosure.

LWD tools incorporate measurement devices into the bottomhole assembly in order to obtain measurements as soon as possible after the well wall is drilled. LWD has thus far been attached to the drill string, for example in specially adapted drill collars located just above the drill bit. Thus, the sensors incorporated into these LWD tools will typically detect formation properties at a depth only after the drill bit drills past that depth. There is a need in the art for improved LWD tools which allow for detection of formation properties before drilling past that depth as well as LWD tools.

FIGURES

Some specific exemplary embodiments of the disclosure may be understood by referring, in part, to the following description and the accompanying drawings.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates generally to well logging tools used in subterranean formations and, more particularly, the present disclosure relates to methods and apparatus for measuring electromagnetic propagation resistivity using a drill bit.

Illustrative embodiments of the present disclosure are described in detail herein. In the interest of clarity, not all features of an actual implementation may be described in this specification. It will of course be appreciated that in the development of any such actual embodiment, numerous implementation-specific decisions must be made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the disclosure. Embodiments of the present disclosure may be applicable to horizontal, vertical, deviated, or otherwise nonlinear wellbores in any type of subterranean formation. Embodiments may be applicable to injection wells as well as production wells, including hydrocarbon wells.

Figure 1:
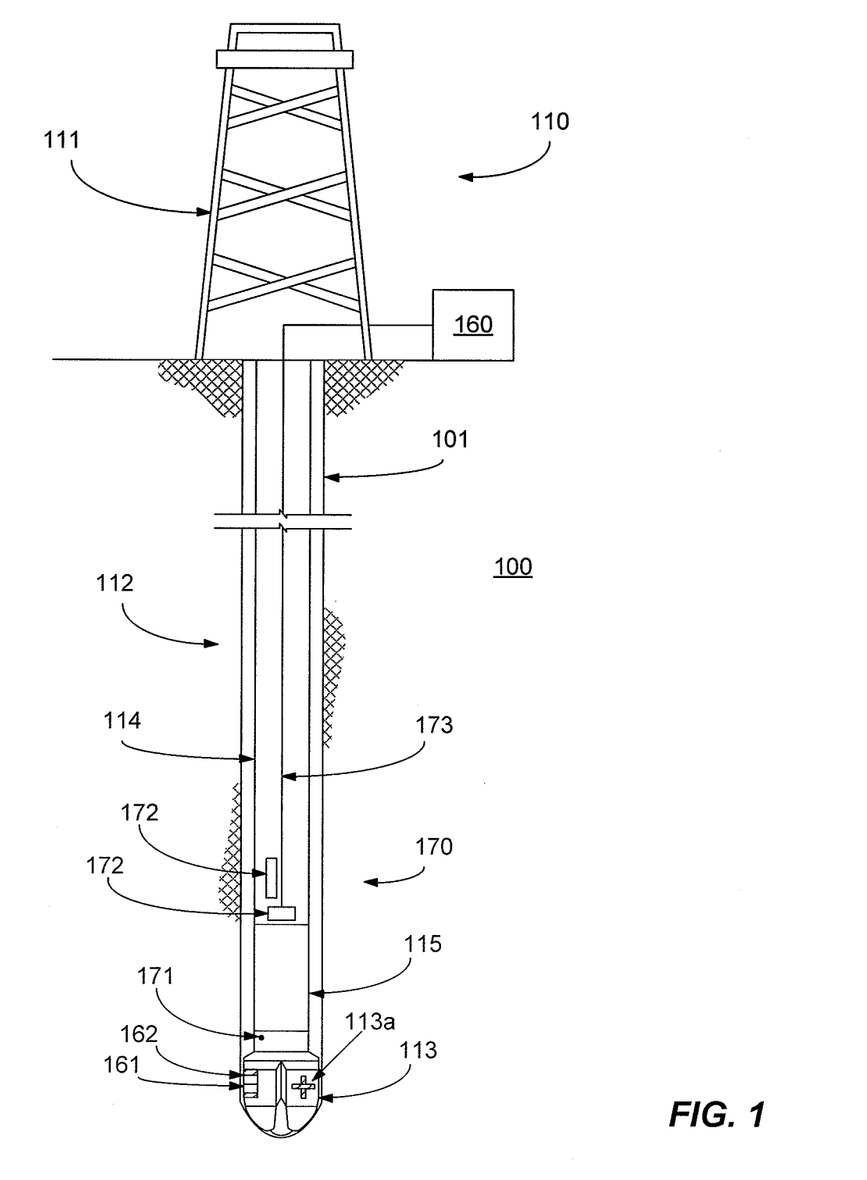
FIG. 1 illustrates a well with an example logging system.

FIG. 1 illustrates a formation 100 that contains a deposit of a desirable fluid such as oil or natural gas. To extract this fluid, a well 101 is ordinarily drilled in the formation 100 using a drilling system 110. In the example drilling system 110 shown in FIG. 1, a drilling rig 111 couples to a drill string 112, which in turn couples to a drill bit 113. As used herein, a drill string is defined as including drill pipe 114, one or more drill collars 115, and a drill bit 113. The term "couple" or "couples" used herein is intended to mean either an indirect or direct connection. Thus, if a first device "couples" to a second device, that connection may be through a direct connection or through an indirect connection via other devices or connectors. Drill string 112 may include a rotary-steerable system (not shown) that drives the action of drill bit 113 from the surface. The action of drill bit 113 gradually wears away the formation, creating and extending well 101. As the depth of well 101 increases, drill operators add additional drill pipe and/or drill collar segments to drill string 112, allowing drill bit 113 to progress farther into formation 100. Drill bit 113 may be steered in any direction to bring well 101 into contact with a fluid deposit.

According to aspects of the present disclosure, in addition to serving as part of drilling system 110, drill bit 113 may be included as part of a LWD system. Drill bit 113 may be capable of logging well 101, including measuring electromagnetic propagation resistivity properties of the formation, identifying fractures, and identifying and resolving geological features such as bedding planes and their relative dip angle and azimuth. As will be discussed below, drill bit 113 may log well 101 using receiver elements 133a disposed on a raised face of drill bit 113. In addition, as will be discussed below, drill bit 113 may also allow for the generation of 3D resistivity profiles around the borehole, which can be represented in graphical form, as well as used for input into complex geological and reservoir models, or as data into complex 3D analysis programs.

A LWD system incorporating drill bit 113 may include a processor 160 to operate the LWD system or to analyze measured properties of formation 100. Although FIG. 1 shows processor 160 at a surface location, processor 160 may be located inside well 101, or it may be located at or near the sea floor if drilling occurs underwater. For example, processor 160 may be located inside drill bit 113 or in drill string 112. In other embodiments, the LWD system may include multiple processors, one of which is located in drill bit 113 along with data storage equipment. If, however, processor 160 is located outside the well, a data storage unit 161 and a battery 162 may be provided within the drill bit 113 to energize measurement elements that will be discussed below as well as store the measured properties downhole. The LWD system may also use the downhole battery 162 as a power source.

The LWD system may also include a telemetry system 170 to transmit data between the surface, processor 160, and drill string 112, as FIG. 1 illustrates. Drill bit 113 may communicate with the LWD telemetry system 170, which may transmit data from drill bit 113 or from a data storage unit 161 to processor 160. Telemetry system 170 may employ, for example, a wireless telemetry system or an acoustic telemetry system. For example, telemetry system 170 may include a short-hop telemetry system such as an antenna 171 and a receiver 172 located downhole. In some embodiments, the antenna may be coupled to the drill bit 113 or the data storage unit 161. Telemetry system 170 may then include a telemetry line 173 to transmit the signals from receiver 172 to the surface. Alternatively, telemetry system 170 may include a telemetry-receiver system 174 located downhole. Telemetry-receiver system 174 may then receive data from antenna 171 and transmit data outside well 101 wirelessly. In an alternative embodiment, the telemetry lines may connect directly to the drill bit. With a wired connection to the drill bit 113, the data storage element and battery can be removed from within the drill bit 113, as the power can be provided from the surface via the wired connection.

Drill bit 113 may transmit energy into formation 100 using at least one transmitter element coupled to the drill bit 113 and may receive at least one of reflected/refracted energy with at least one receiver element coupled to the drill bit 113. As used herein, the term "formation" includes mineral beds and deposits, and the fluids contained therein. Also, as used herein, the term "energy" includes electromagnetic waves in all their forms. Short pulses and extended duration wave patterns are to be included. These waves may be characterized by a frequency, velocity and wavelength. Further, the relative locations of particular features of a wave, such as peaks and troughs, may also be characterized by a phase. By radiating energy at the formation, drill bit 113 will induce energy from the formation. This induced energy will carry information about the properties of the formation.

Figure 2:
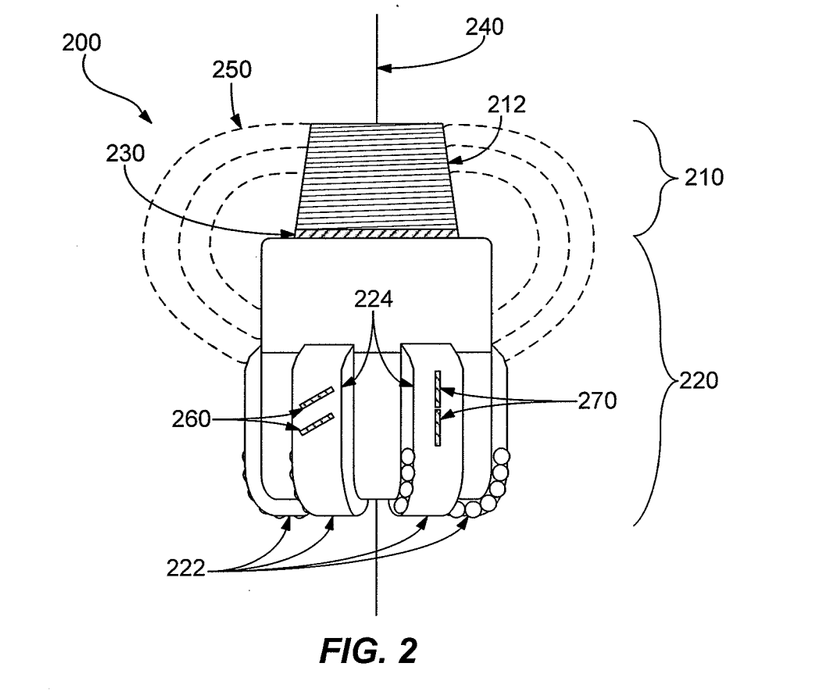
FIG. 2 illustrates a perspective view of a drill bit incorporating aspects of the present disclosure.

FIG. 2 illustrates an example drill bit 200, incorporating transmitter and receiver elements. Example drill bit 200 shown in FIG. 2 may be one of a polycrystalline diamond compact (PDC) drill bit, as is well known in the art. For the sake of clarity, the drill bit 200 is shown disconnected from a drill string. Drill bit 200 has a shank section 210 and a cutting section 220. The shank section 210 is at the top of drill bit 200 and includes threads 212, used to connect drill bit 200 to a drill collar in a drill string. The cutting section 220 includes blades 222, and each of the blades 222 include a raised face 224.

Drill bit 200 includes a transmitter element 230 coupled to shank section 210. In the present embodiment, the transmitter element 230 comprises a loop antenna that surrounds an exterior surface of the shank section 210, such that the loop antenna is substantially coaxial with the vertical axis 240 of drill bit 200. In some embodiments, the loop antenna may be disposed within a machined groove on the drill bit 200. The loop antenna may be comprised of a ferrite ring wrapped in wire, which transmits energy into a subterranean formation when excited with electrical current. Because drill bits, such as drill bit 200, are generally composed of a conducting material, the loop antenna may be electrically isolated from the body of the drill bit by an insulating layer composed of any one of a number of insulating materials well known in the art.

Figure 3:
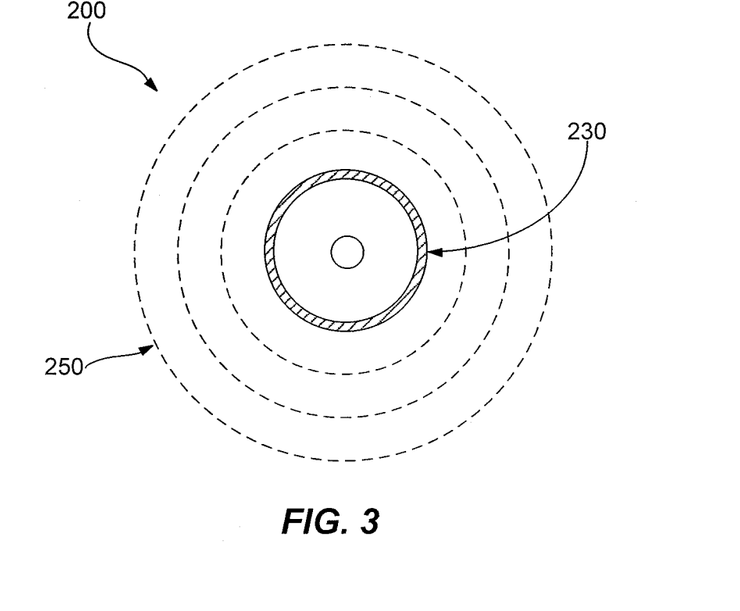
FIG. 3 illustrates a horizontal cross section of the drill bit in FIG. 2.

FIG. 2 illustrates the energy field propagated by the drill bit 200 using lines 250, radiating outwardly from the loop antenna. As can be seen, the energy field generally propagates equally in all directions from the loop antenna. To better illustrate the energy field, FIG. 3 includes a horizontal cross-section of drill bit 200 through the loop antenna, and shows the generally consistent horizontal propagation pattern 250 of the loop antenna 230. As can be seen in both FIGS. 2 and 3, using a loop antenna to propagate energy into the formation is advantageous because a loop antenna does not generally suffer from the constructive/destructive interference problems that an array of point sources might. Additionally, the energy field propagated by the loop antenna is rotationally tolerant, meaning that the antenna can be rotated along its center axis without significantly changing the energy field. As will be discussed below, the generally constant and rotationally tolerant energy field created by the loop antenna allows for greater control of the directional components measured through the orientation of receiver elements within the energy field.

Returning to FIG. 2, drill bit 113 includes receiver elements 260 and 270 coupled to the raised faces 224 of blades 222. The receiver elements 260 and 270 in FIG. 2 comprise rod antennae. Like a loop antenna, the rod antenna may be comprised of a ferrite material wrapped in wire. Each receiver element can be positioned at a multitude of orientations relative to the transmitter element 230 and the other receiver elements. Receiver elements 270, for example, are positioned end-to-end, such that they share a common plane, and are at an angle generally perpendicular to the plane of the transmitter element 230. Receiver elements 260, on the other hand, are biased at an angle less than perpendicular to the transmitter element 230 and are separated such that they are on different, parallel planes. Other orientations are possible. For example, in FIG. 4, receiver elements 410 on drill bit 400 include two rod antenna that overlap to form a cross, where one rod antenna is position in a plane generally perpendicular to the plane of transmitter element 430 and the other rod antenna is positioned on a plane generally parallel to the plane of transmitter element 430. In contrast, receiver elements 420 include three rod antenna, all of which overlap, that are offset at various angles.

Figure 4:
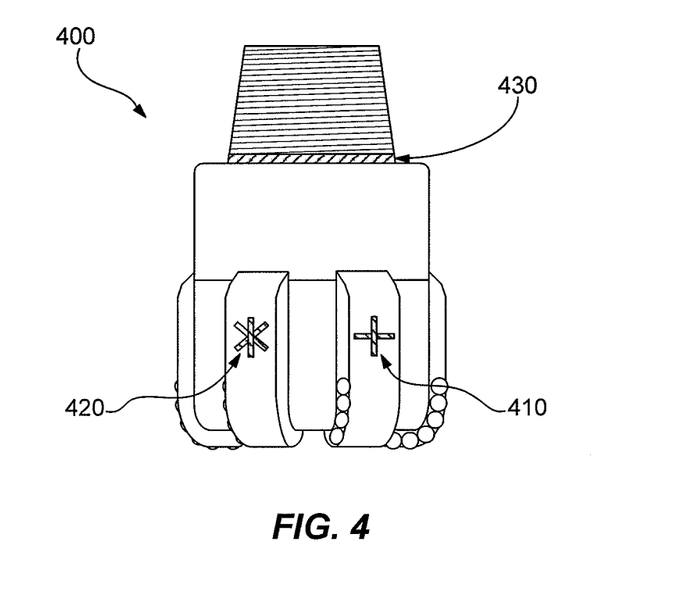
FIG. 4 illustrates a perspective view of a drill bit incorporating aspects of the present disclosure.
Figure 5:
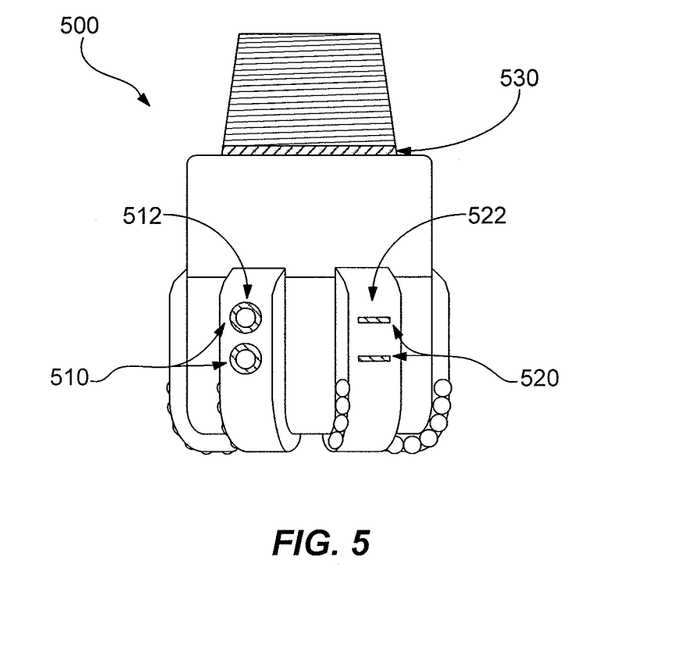
FIG. 5 illustrates a perspective view of a drill bit incorporating aspects of the present disclosure.

FIG. 5 illustrates yet another example drill bit 500, incorporating aspects of the present disclosure. Unlike the receiver elements in FIGS. 2 and 4, however, receiver elements 510 and 520 comprise loop antennae. The loop antenna comprising receiver elements 510 are shown coupled to and flush with an outer surface of the raised face 512. In contrast, the loop antenna comprising receiver elements 520 are inserted into machined notches in the raised face 522, such that the loop antennae are disposed within the raised face 522 at a plane generally parallel to the plane of the transmitter element 530. In other embodiments, more or less than two loop antenna may be used on each raised face of drill bit 500. Additionally, in some embodiments, each of the raised faces of a drill bit may include receiver elements at the same or similar orientations, instead of different orientations as shown in FIGS. 2, 4, and 5.

The orientation of the receiver elements on the drill bit—including the distance from the transmitter element, the angle of the receiver elements relative to the transmitter element, and the distance between the receiver elements—at least partially control the characteristics of the measurements taken by the drill bit. The distance between the transmitter element and the receiver elements, as well as the frequency of the energy field excited by the transmitter element, decide the depth of investigation of the sensor. Generally, the further apart the transmitter and receivers are, the deeper the system will measure into the formation. The directional component of the energy field measured by the drill bit is influenced by the angle of the receiver elements relative to the transmitter element and, more particularly, the energy field created by the transmitter element. Rod antenna such as those used for receiver elements 260 and 270 include propagation patterns that are strongest along the direction in which the ends of the rod antenna are pointed. Thus, by angling the rod antenna relative to the transmitter antenna, a specific directional component of the energy field can be selected for measurement. Additionally, the distance between the receiver elements affects the resolution of the measurement, as the closer the receiver elements are, the smaller the variation in energy field the receiver elements will be able to detect.

Figure 6:
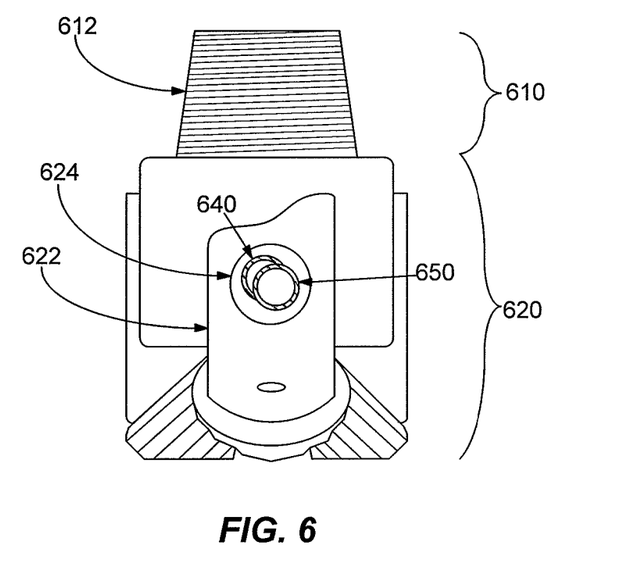
FIG. 6 illustrates a perspective view of a drill bit incorporating aspects of the present disclosure.

FIG. 6 illustrates an example embodiment where the distance between the transmitter element and the receiver elements is decreased for a specific type of resistivity measurement, a di-electric measurement, where a very high frequency signal, on the order of a gigahertz, is required. In alternative embodiment, high frequency signals on the order of one megahertz may be used. In yet other embodiments, signals between one megahertz and one gigahertz, such as fifty megahertz, one-hundred megahertz, and five hundred Drill bit 600 in FIG. 6 is a roller cone bit with a shank portion 610 and a cutting portion 620. Like the drill bits in FIGS. 2, 4, and 5, drill bit 600 includes raised faces 622 projecting outward from the drill bit. Also like the drill bits in FIGS. 2, 4, and 5, roller cone bit 600 includes threads 612 on shank section 610. Instead of coupling a transmitter element to the shank 610, however, the drill bit 600 includes a cavity 624 on raised face 622, which includes both the transmitter element 640 and the receiver elements 650. In the embodiment shown, the transmitter and receiver elements may all be loop antenna, laced together or at least partially overlapping within the cavity 624. For example, the transmitter and receiver elements may include separate coils of wire wrapped around the same ferrite core. In other embodiments, the transmitter and receiver elements may be some combination of loop and rod antennae. The cavity 624 may be either partially exposed through the raised faces 622 of drill bit 600 or may be completely disposed within the drill bit 600. Although the current configuration is shown on a roller cone bit, nothing prevents the embodiment from being implemented on a PDC bit, as illustrated in FIGS. 2, 4, and 5. Likewise, nothing prevents the embodiments of the transmitter element and receiver elements from FIGS. 2, 4, and 5 from being implemented on a roller cone bit, such as the bit shown in FIG. 6.

Figure 8:
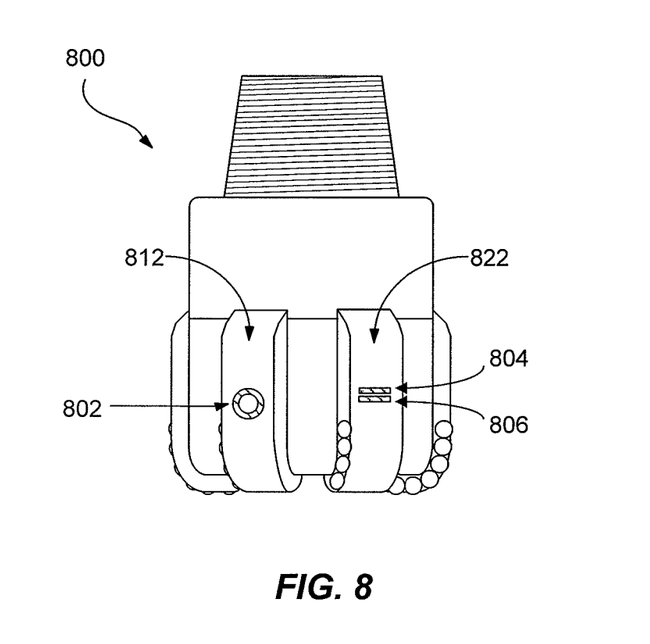
FIG. 8 illustrates a perspective view of a drill bit incorporating aspects of the present disclosure.

FIG. 8 illustrates an additional example embodiment for di-electric measurement. The drill bit 800 may comprise a PDC bit with a transmitter/receiver combination disposed on raised faces 812 and 822. In other embodiments, each raised face of the drill bit 800 may include transmitter/receiver combinations for di-electric measurements. Loop antenna 802, for example, may comprise separate wires wrapped around a single ferrite core. One wire may comprise a transmitter that emits energy to the formation at a frequency of at least one megahertz, or in other embodiment, one gigahertz. The other wire may comprise a receiver that receives the reflected energy from the formation. In an alternative embodiment, the transmitter 804 and receiver 806 may comprise separate rod antenna, both disposed on raised face 822. Transmitter 804 and receiver 806 may be positioned in a parallel plane, at a lateral distance determined, in part, according to the energy frequency generated by the transmitter 804.

As previously mentioned, a drill bit incorporating aspects of the present disclosure may be included as part of a LWD system. As also previously mentioned, the LWD system may transmit data received from the drill bit to a processor and storage equipment located at the surface. In other embodiments, electronics may be incorporated into the drill bit, allowing the drill bit to act as a stand alone object. For example, a processor, battery, and storage element may be incorporated into the drill bit. The drill bit may then collect data and store the data internally, to be collected when the drill bit is retrieved from within the wellbore. In other embodiments, the drill bit may be connected via wires to the LWD system, providing power to the transmitter and receiver elements in the drill bit as well as providing the necessary processing and storage capacity for logging the subterranean formation.

Figure 7:
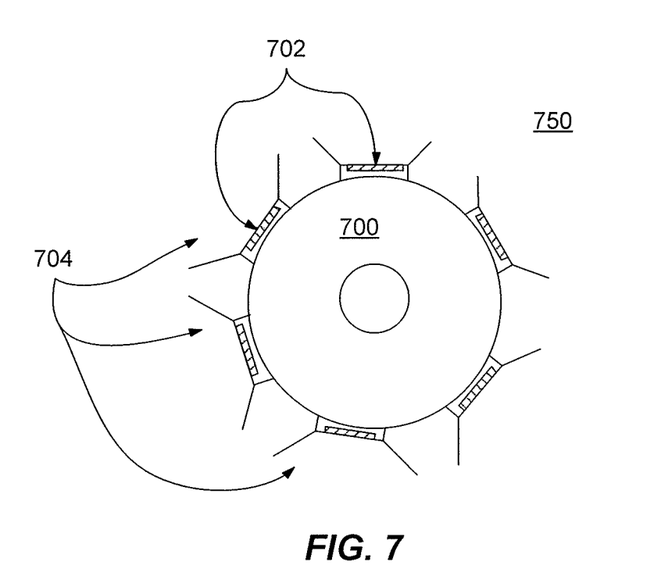
FIG. 7 illustrates a horizontal cross section of a drill bit incorporating aspects of the present disclosure.

A processor and storage system, whether included within the drill bit or remotely in a LWD system, may be used to track the position of the antenna in the borehole. For example, the processor can identify an angular location of each receiver antenna in the borehole. FIG. 7 illustrates a cross section of a drill bit 700, including multiple receiver elements 702, disposed in well bore 710 within formation 750. Each of the receiver elements may receive energy from the formation in the direction indicated by cones 704. By tracking the position of the receiver antennae in the borehole, including depth and angle, the processor can assemble the directional measurements taken by the receiver antenna in a 3D resistivity profile. The 3D resistivity profiles can then be represented in graphical form, as well as used for input into complex geological and reservoir models, or as data into complex 3D analysis programs. Once generated, the reservoir models can be used for geosteering and geostopping applications. For example, if the drill bit 113 of FIG. 1 measures formation resistivity and generates a reservoir model, drilling operators can use the model to determine how to steer the bit to the desired formation as well as when to stop the bit once the desired location has be reached. In some embodiments, the model can be generated in real time, allowing steering decisions to be made on the fly without having to withdraw the drill string or shoot past the desired location to take a reading with an existing LWD system located on the drill string.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the element that it introduces.

What is claimed is:

1. An apparatus for electromagnetic propagation resistivity measurement of a subterranean formation, comprising:
   a drill bit, wherein the drill bit comprises a cutting portion having at least one raised face;
   a transmitter element coupled to the at least one raised face, wherein the transmitter element is electrically isolated from the drill bit;
   a receiver element coupled to the at least one raised face, wherein the transmitter element and the receiver element at least partially overlap, and wherein the transmitter element and the receiver element comprise separate coils of wire wrapped around a same ferrite core; and
   a second receiver element coupled to the at least one raised face, wherein the second receiver element comprises a plurality of rod antennae that overlap.

2. The apparatus of claim 1, wherein the transmitter element radiates energy into the subterranean formation with a frequency of at least one megahertz.

3. The apparatus of claim 2, wherein the transmitter element and the receiver element comprise loop antennae.

4. The apparatus of claim 3, wherein the loop antenna is coupled to and flush with an outer surface of the at least one raised face.

5. The apparatus of claim 2, further comprising a second transmitter element coupled to the at least one raised face, wherein the second transmitter element comprises a rod antenna.

6. The apparatus of claim 1, further comprising at least one data processing or data storage element disposed within the drill bit.

7. The apparatus of claim 1, further comprising at least one receiver element and at least one transmitter element disposed on each raised face of the drill bit.

8. The apparatus of claim 1, wherein the at least one raised face comprises a cavity, and wherein the transmitter element is within the cavity.

9. An apparatus for electromagnetic propagation resistivity measurement of a subterranean formation, comprising:
   a drill bit;
   a transmitter element coupled to a raised face of the drill bit, wherein the transmitter element propagates an electromagnetic wave into the subterranean formation with a frequency of at least one megahertz, and wherein the transmitter element is electrically isolated from the drill bit;
   a receiver element coupled to the raised face, wherein the receiver element is oriented at a pre-determined distance from the transmitter element, wherein the pre-determined distance is based, at least in part, on the frequency of the electromagnetic wave, and wherein the transmitter element and the receiver element comprise separate coils of wire wrapped around a same ferrite core; and
   a second receiver element coupled to the raised face, wherein the second receiver element comprises a plurality of rod antennae that overlap.

10. The apparatus of claim 9, wherein the transmitter element and the receiver element comprise loop antennae.

11. The apparatus of claim 10, wherein the loop antenna is coupled to and flush with an outer surface of the raised face.

12. The apparatus of claim 9, wherein the transmitter element and the receiver element comprise rod antennae.

13. The apparatus of claim 9, further comprising at least one data processing or data storage element disposed within the drill bit.

14. The apparatus of claim 9, further comprising at least one receiver element and at least one transmitter element disposed on each raised face of the drill bit.

15. The apparatus of claim 9, wherein the raised face comprises a cavity, and wherein the transmitter element is within the cavity.

16. A method for electromagnetic propagation resistivity measurement of a subterranean formation, comprising:
    positioning a drill bit in a subterranean formation;
    radiating a first electromagnetic energy from a transmitter coupled to a raised face of the drill bit, wherein the first electromagnetic energy includes a frequency of at least one megahertz, wherein the transmitter is electrically isolated from the drill bit;
    receiving a second electromagnetic energy at a receiver coupled to the raised face and at least partially overlapping the transmitter, wherein the transmitter and the receiver comprise separate coils of wire wrapped around a same ferrite core;
    receiving a third electromagnetic energy at a second receiver coupled to the raised face, wherein the second receiver comprises a plurality of rod antennae that overlap; and
    measuring a directional component of the second electromagnetic energy determined by the angle of the receiver relative to the transmitter.

17. The method of claim 16, wherein the transmitter and the receiver comprise loop antennae.

18. The method of claim 16, wherein the transmitter and the receiver comprise rod antennae.

19. The method of claim 16, wherein the raised face comprises a cavity, and wherein the transmitter is within the cavity.

20. The method of claim 16, wherein the receiver comprises a loop antenna, wherein the loop antenna is coupled to and flush with an outer surface of the raised face.

* * * * *